Patented Feb. 14, 1933

1,897,188

UNITED STATES PATENT OFFICE

WALTER G. CHRISTIANSEN, OF GLEN RIDGE, NEW JERSEY, AND SIDNEY E. HARRIS, OF LYNBROOK, NEW YORK, ASSIGNORS TO E. R. SQUIBB & SONS, OF NEW YORK, N. Y., A CORPORATION OF NEW YORK

DIALKYL RESORCINOLS

No Drawing.   Application filed July 7, 1932.  Serial No. 621,300.

This invention relates to, and has for its object the provision of dialkyl resorcinols of the general formula $C_6H_2(OH)_2R'R''$ wherein R' and R'' represent different alkyls one of which contains three or more carbon atoms.

Among the many dialkyl resorcinols within the purview of the invention are the methyl propyl, the methyl butyl, the ethyl propyl, the methyl amyl, the ethyl butyl, the methyl hexyl, the ethyl amyl, the propyl butyl, the propyl amyl.

Methyl n-amyl resorcinol may be prepared by the process described in the following example: In a solution of 8.9 g. of n-amyl resorcinol in 100 cc. of dry ether, 10.4 g. of zinc cyanide is kept in suspension by agitation; and dry hydrogen chloride is introduced until saturation is reached, and then for an additional hour; and, the aldimide hydrochloride formed having settled out as an oil, the ether is decanted therefrom; the oil is washed with 50 cc. of dry ether, 75 cc. of hot water is added, and the remaining traces of ether are removed by evaporation on a steam-bath, a reddish sticky substance then separating out; the suspension is boiled; and, after cooling, the water is decanted from the precipitate, which is n-amyl resorcyl aldehyde. This aldehyde is boiled with 50 g. of zinc amalgam and 100 cc. of 1-1 hydrochloric acid solution; extraction is made with ether, the extract is washed with water and dried over sodium sulfate, and the ether is then removed by evaporation; the residue is distilled under vacuum and the fraction boiling at 165–170° C/2.5 mm., which is methyl n-amyl resorcinol, is collected.

Ethyl butyl resorcinol may be prepared by the process described in the following example: A mixture of 20 g. of n-butyl resorcinol, 12 g. of acetic anhydride, and 100 cc. of glacial acetic acid is refluxed for two hours, the acetic acid is distilled off under reduced pressure, and the residue, which is n-butyl resorcinol monoacetate (boiling at 147–150° C/2.mm.), is then distilled. To 19 g. of this monoacetate, 8 g. of zinc chloride is added, the mixture is heated at 125–130° C. for five hours, diluted with 100 cc. of boiling water, and thoroughly washed by blowing with steam; the mixture then being allowed to separate, the water is decanted off and the residue distilled under reduced pressure; and the portion distilling at 164–166° C./3 mm., which is n-butyl resacetophenone, is collected. A mixture of 10 g. of this resacetophenone with 34 g. of amalgamated zinc and 250 cc. of 20% hydrochloric acid solution is boiled until a test portion no longer gives a red color with ferric chloride, and then allowed to cool; and the oil, ethyl n-butyl resorcinol, is separated from the aqueous layer and distilled under reduced pressure, boiling at 150–151° C./2.5 mm.

N-propyl n-butyl resorcinol may be prepared by the process described in the following example: A mixture of 33 g. of n-butyl resorcinol, 26 g. of propionic anhydride, and 100 cc. of propionic acid is refluxed for two hours, the propionic acid is distilled off under reduced pressure, and the residue, which is n-butyl resorcinol monopropionate (boiling at 161–165° C./2 mm.) is then distilled. To 37 g. of this monopropionate, 15 g. of zinc chloride is added, and the mixture is heated at 125–130° C. for 4½ hours, and the viscous oily product is washed with boiling water and distilled under reduced pressure, yielding n-butyl n-propionyl resorcinol, a yellow oil, which crystallizes on long standing. A mixture of 22 g. of this n-butyl n-propionyl resorcinal with 68 g. of amalgamated zinc and 400 cc. of 20% hydrochloric acid solution is refluxed and stirred until ferric chloride no longer gives a reaction with a test portion; the mixture is allowed to cool, and the oil is separated from the aqueous layer and distilled under reduced pressure, the boiling point being 153–160° C./3 mm. The distillate, n-propyl n-butyl resorcinol, is a viscous, colorless oil.

Dialkyl resorcinols of this invention are characterized by especial germicidal activity.

It is to be understood that the foregoing embodiments are merely illustrative and by no means limitative of the invention, which may assume various other forms—as to the particular dialkyl resorcinols prepared and the reactants and procedures employed— within the scope of the appended claims.

We claim:

1. Dialkyl resorcinols of the general formula $C_6H_2(OH)_2R'R''$ wherein R' and R'' represent different alkyls one of which contains three or more carbon atoms.
2. Methyl amyl resorcinol.
3. Ethyl butyl resorcinol.
4. Propyl butyl resorcinol.

In witness whereof we affix our signatures.

WALTER G. CHRISTIANSEN.
SIDNEY E. HARRIS.

DISCLAIMER 1,897,188.—*Walter G. Christiansen*, Glen Ridge, N. J., and *Sidney E. Harris*, Lynbrook, N. Y. DIALKYL RESORCINOLS. Patent dated February 14, 1933. Disclaimer filed January 8, 1935, by the assignee, *E. R. Squibb & Sons*.

Hereby enters this disclaimer to that part of the claim in said specification which is in the following words, to wit:

"1. Dialkyl resorcinols of the general formula $C_6H_2(OH)_2R'R''$ wherein R' and R'' represent different alkyls one of which contains three or more carbon atoms."

[*Official Gazette February 5, 1935*.]

within the scope of the appended claims.

We claim:

1. Dialkyl resorcinols of the general formula $C_6H_2(OH)_2R'R''$ wherein R' and R'' represent different alkyls one of which contains three or more carbon atoms.
2. Methyl amyl resorcinol.
3. Ethyl butyl resorcinol.
4. Propyl butyl resorcinol.

In witness whereof we affix our signatures.

WALTER G. CHRISTIANSEN.
SIDNEY E. HARRIS.

DISCLAIMER 1,897,188.—*Walter G. Christiansen*, Glen Ridge, N. J., and *Sidney E. Harris*, Lynbrook, N. Y. DIALKYL RESORCINOLS. Patent dated February 14, 1933. Disclaimer filed January 8, 1935, by the assignee, *E. R. Squibb & Sons*.

Hereby enters this disclaimer to that part of the claim in said specification which is in the following words, to wit:

"1. Dialkyl resorcinols of the general formula $C_6H_2(OH)_2R'R''$ wherein R' and R'' represent different alkyls one of which contains three or more carbon atoms."

[*Official Gazette February 5, 1935.*]

DISCLAIMER 1,897,188.—*Walter G. Christiansen*, Glen Ridge, N. J., and *Sidney E. Harris*, Lynbrook, N. Y. DIALKYL RESORCINOLS. Patent dated February 14, 1933. Disclaimer filed January 8, 1935, by the assignee, *E. R. Squibb & Sons*.

Hereby enters this disclaimer to that part of the claim in said specification which is in the following words, to wit:

"1. Dialkyl resorcinols of the general formula $C_6H_2(OH)_2R'R''$ wherein $R'$ and $R''$ represent different alkyls one of which contains three or more carbon atoms."

[*Official Gazette February 5, 1935.*]